SCHMIDLIN & DRISCOLL.
Street Lamp.
No. 101,769.
Patented April 12, 1870.
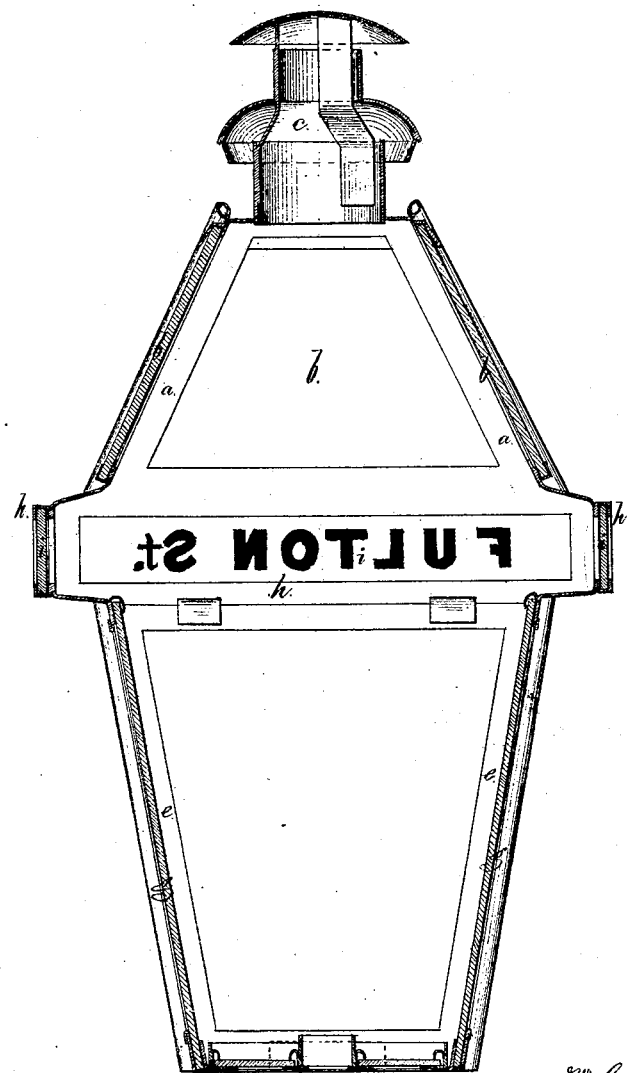

United States Patent Office.

WILLIAM G. SCHMIDLIN AND JEREMIAH W. DRISCOLL, OF NEW YORK, N. Y.

Letters Patent No. 101,769, dated April 12, 1870.

IMPROVEMENT IN STREET-LAMPS.

The Schedule referred to in these Letters Patent and making part of the same.

*To all whom it may concern:*

Be it known that we, WILLIAM G. SCHMIDLIN and JEREMIAH W. DRISCOLL, of the city and State of New York, have invented an Improvement in Street-Lamps; and the following is declared to be a full and correct description thereof.

This invention relates to the frame of the lamp, and consists in the introduction of straight slides between the top and bottom portion of the lamp, and projecting prominently beyond the ordinary frame, for the reception of a removable name-plate, so that the street-lamp can have inserted into it with facility the names of the streets, and such names are held firmly in place, and are not liable to become broken like the movable pieces of glass that are often employed within the lamp, and on which the street name is painted.

In the drawing we have shown a vertical section of the lamp, fitted with our improvement.

The upper part of the lamp is formed of a pyramidal frame, *a*, receiving the glasses *b*, and supporting the ventilating cap *c*, as usual.

The lower portion of the lamp is made of the frames *e e*, at the angles and the bottom frame *f*.

The frames *e e* diverge, so as to be wider apart at the upper ends and receive the glasses *g*, all of the usual size or desired construction.

We introduce the projecting slides or frames *h h* between the upper and lower parts of lamp, and thereby a space is formed of the width necessary for receiving the name-plates *i i*.

The name-plates may stand vertically or be slightly inclined, the frame *h* being made accordingly.

These name-plates *i i* are to be of glass, painted or cut, or of perforated metal or other material, and slipped into the grooves provided for them in the frame *h*, either endwise and horizontally or vertically from below, and a small metal strip to be bent over and form a tie or clasp, is employed to hold the plate in place.

A lamp made in this manner is very strong and durable, the name-plate is not liable to become misplaced or broken, and the glass of the lamp can be kept clean with the greatest facility.

We claim as our invention—

The frames *h* for the name-plates, projecting outside of the upper part of the frames *e* and glasses *g*, and to which frames *h* and pyramidal frame *a* is connected, as set forth.

Signed by us this 15th day of February, 1870.
    WILLIAM G. SCHMIDLIN.
    JEREMIAH W. DRISCOLL.

Witnesses:
 CHAS. H. SMITH,
 GEO. T. PINCKNEY.